United States Patent [19]

Pecht et al.

[11] Patent Number: 5,217,233
[45] Date of Patent: Jun. 8, 1993

[54] SPIRAL GROOVE SEAL SYSTEM FOR SEALING A HIGH PRESSURE GAS

[75] Inventors: Glenn G. Pecht; Paul L. Feltman, Jr., both of Chicago, Ill.

[73] Assignee: John Crane Inc., Morton Grove, Ill.

[21] Appl. No.: 428,952

[22] Filed: Oct. 30, 1989

[51] Int. Cl.⁵ .............................................. F16J 15/34
[52] U.S. Cl. ......................................... 277/65; 277/1; 277/93 SD; 277/96.1
[58] Field of Search .................. 277/65, 93 SD, 93 R, 277/96.1, 81 R, 1

[56] References Cited

U.S. PATENT DOCUMENTS

| | | | |
|---|---|---|---|
| 2,882,694 | 4/1959 | Vander Arend et al. | 220/901 |
| 3,088,621 | 5/1963 | Brown | 220/901 |
| 3,339,930 | 9/1967 | Tracy | 277/93 R X |
| 3,762,175 | 10/1973 | Jones | 220/901 |
| 4,212,475 | 7/1980 | Sedy | 277/93 SD |
| 4,290,611 | 9/1981 | Sedy | 277/65 X |
| 4,423,879 | 1/1984 | Takenaka et al. | 277/96.1 |
| 4,889,348 | 12/1989 | Amundson et al. | 277/65 X |

Primary Examiner—William A. Cuchlinski, Jr.
Assistant Examiner—Daniel G. DePumpo
Attorney, Agent, or Firm—Kinzer, Plyer, Dorn, McEachran & Jambor

[57] ABSTRACT

A seal system for sealing a housing and rotatable shaft against leakage of a gas under high pressure; hydrogen is an example. The system, using multiple seals in tandem, provides a stepped reduction of high pressure gas at full height pressure to a low pressure across the individual seal modules.

The seal system has plural, axially spaced spiral-grooved end face seal modules mounted between the shaft and housing, the axial spaces between the seals defining a chamber. Each seal module has a primary seal ring affixed to the housing and a mating ring affixed for rotation with the shaft, the two rings having opposed, radially extending faces; each mating ring has a plurality of radial spiral grooves extending radially inward from the outer diameter or circumference.

22 Claims, 1 Drawing Sheet

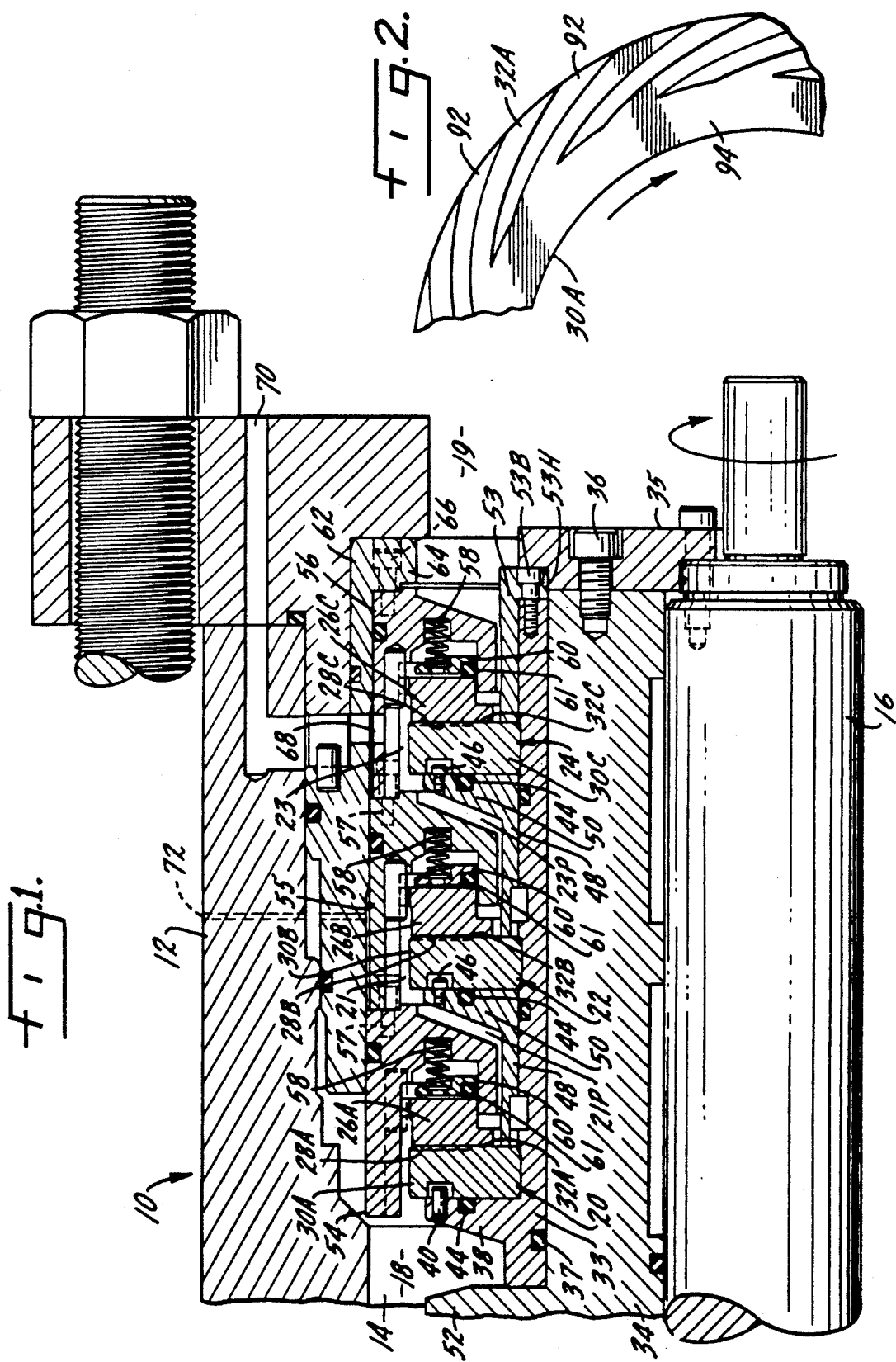

SPIRAL GROOVE SEAL SYSTEM FOR SEALING A HIGH PRESSURE GAS

This invention relates to seals for restricting leakage of a fluid about a shaft extending through a housing, such as a turbine or compressor, and in particular a gas under high pressure.

Prior to this invention, mechanical seals for sealing gases, such as hydrogen, at high pressures, for instance, exceeding 1200 pounds per square inch gauge (p.s.i.g.), were of a type using two spaced apart mechanical end face seals. This system was of the "wet", contacting type which had to be cooled and lubricated by a buffer liquid pumped between the two spaced mechanical seals. The system for circulating the buffer liquid (frequently oil) included pumps, coolers and reservoirs which added complexity and expense. Further, the mechanical seals, even with their complicated support system, often had a short duration. Complete shutdown of the system is required to replace the seals.

Mechanical end face dry running gas seals operate without any lubrication. Seals of this type are shown and described in U.S. Pat. No. 4,212,475, issued to Josef Sedy and assigned to the present assignee, incorporated by reference herein.

Another type of seal, described in U.S. Pat. No. 4,889,348, commonly assigned to the assignee of the present invention, utilizes the teaching of U.S. Pat. No. 4,212,475 to create a seal in equipment handling liquids under high pressures, such as liquefied light hydrocarbons. This type of seal creates shear heating of the sealed fluid between the seal faces of a sealing module of the type having spiral grooves described in U.S. Pat. No. 4,212,475.

One object of the present invention is to provide a dry gas end face seal arrangement which is particularly appropriate for use in equipment handling light gases under very high pressure, for example pressures which may exceed 1800 p.s.i.g., and to accomplish this by a breakdown or split of pressure across two or more such seals without need for external pressure control devices. The solution proposed by the inventors herein is a series of modules each having a pair of sealing faces, of which one seal face is of the spiral groove type, across which there is a pressure drop of predictable (calculated) proportion achieved by altered face geometry (e.g. groove dimension) in each module. Thus, for example, the pressure drop may be distributed in approximately equal proportions across two or more separate modules, thereby relieving seal stress or overloading without need for external controls.

Another object of the invention is to enable pressure breakdown, or splitting, to be easily and inexpensively accomplished simply by using spiral groove seal rings of substantially the same profile differing only in groove depth or dam width dimensions, a matter of etching rings of similar profile to afford successive stages of pressure step-down. There can be as few as two modules; there may be three, four or even five in tandem.

SUMMARY OF THE INVENTION

The present invention is directed to a mechanical end face seal system which is particularly appropriate for compressors handling a gas under very high pressure. This is accomplished through the use of a seal arrangement preferably having a high pressure upstream module, and both an intermediate and a downstream seal module, each mounted on a shaft and housing associated with the compressor or pump. However, the principles of the invention may be incorporated in an end seal arrangement having only two modules. Each seal module has a primary ring affixed to the housing and a mating ring affixed to the shaft. The rings have opposing, radially extending faces, one of which has a plurality of radially directed, circumferentially spaced spiral pumping grooves extending from one circumference thereof. The grooves of the upstream module exposed to the highest pressure have a predetermined groove restriction from the standpoint of groove dimension, which is considered optimum, while the grooves of each downstream module have a greater groove dimension than the upstream module, thereby imposing less restriction.

In a preferred form, decreased restriction is achieved by increasing the groove depth of the downstream module.

BRIEF DESCRIPTION OF THE DRAWINGS

FIG. 1 is a cross section, axially, of a housing and shaft incorporating a preferred embodiment of the invention; and FIG. 2 is an end view of a segment of one of the sealing rings of the preferred embodiment of the invention.

DESCRIPTION OF THE PREFERRED EMBODIMENT

FIG. 1 illustrates a seal generally indicated at 10 constructed in accordance with the preferred embodiment of the invention. The seal is designed to seal gas under very high pressure, for example, hydrogen gas exceeding about 1800 p.s.i., in a pump, compressor or turbine housing. Although the invention is at times described with reference to hydrogen gas as a fluid, it is to be understood that other gases or liquids under very high pressures can be handled with the appropriate changes and adjustments to the system to conform the essential parameters to the fluid being sealed.

A stuffing box or housing is indicated at 12 enclosing the seals and affording a shaft passage 14. A shaft 16 extends through the shaft passage from a high pressure chamber 18 in the housing 12 to the atmosphere at 19.

The seal assembly inside the housing is a tandem arrangement of axially spaced mechanical end face seals of the spiral groove type, each having opposed ring portions respectively secured to the housing 12 and shaft 16. The seals are generally of the type shown and described in U.S. Pat. No. 4,212,475, referred to above. The tandem seal assemblies include an upstream or inner seal module 20 located in the high pressure chamber 18, at least one intermediate seal module 22, and, preferably, a third downstream or outer seal module 24 respectively located within annular chambers 21 and 23 inside the housing.

Each seal module has a pair of annular rings comprising stationary primary rings 26A, 26B, 26C (ring stators) with radially extending faces 28A, 28B, 28C. The primary seal ring elements are opposed to mating rings 30A, 30B, 30C having radially extending faces 32A, 32B, 32C opposite the faces, respectively, 28A, 28B, 28C of the primary rings. To prevent rotation, the primary rings 26A, 26B, 26C are secured to the housing by a retainer assembly, as will be described, while allowing limited axial movement. The mating seal rings 30A, 30B, 30C are affixed for rotation with the shaft 16 by a spacer sleeve assembly comprising a ring sleeve 33 and a shaft sleeve 34 keyed thereto, effectively locked to shaft 16 for rotation therewith as will be described.

The seal shown is exposed to a fluid to be sealed at the radially outer diameter of the seal components. The principles of the invention, however, are applicable to seals having the higher pressure at the radially inner diameter of the relatively rotating seal faces.

The sleeve assembly, as noted, includes a shaft sleeve 34 which fits upon the shaft 16 and is fixed to the shaft by a clamping end plate 35 secured to shaft sleeve 34 by a bolt 36. Alternatively, a drive key arrangement (not shown) may be used to secure shaft sleeve 34 to the shaft 16. At the inboard or upstream end, an O-ring 37 provides a seal between the sleeves 33 and 34. There are additional O-ring seals requiring no elaboration.

The upstream or high pressure seal module 20, communicating with the high pressure chamber 18, includes an annular support flange 38, FIG. 1, which is an integral portion of sleeve 33. Pin 40 connects ring 30A for rotational drive to flange 38.

The sleeve assembly further includes spacer sleeves 48 keyed for rotation to sleeve 33. The sleeves have support flanges 50, holding pins 46 which engage and drive the mating rings 30B, 30C of the intermediate and outboard seal modules 22, 24, respectively. O-rings 44 are interposed between the opposed faces of the support flanges 50 and the rotating seal rings. The spacer sleeves 48 extend to and engage the radial surfaces 32A, 32B adjacent the inside diameter of the mating rings 30A, 30B.

Alternatively, an arrangement which includes an annular split wedge in turn held by a clamping ring can be used, as is shown and described in the aforementioned U.S. Pat. No. 4,889,348. The exact construction utilized to secure the rotary rings of the seal assemblies to shaft 16 is not of critical importance to the practice of the invention.

As noted above, sleeve 34 is held to shaft 16 for rotation therewith by a drive plate 35. The ring sleeve 33 at its inner or upstream end bears against a radially projecting flange 52 on shaft sleeve 34. The ring sleeve 33 at its outboard end has a lock collar 53 mounted concentrically thereon. The inner end of the lock collar bears against the opposed radially inward circumferential surface of mating ring 30C. The outer end of the lock collar 53 has a head or flange 53H secured to the end face of ring sleeve 33 bolt 53B. By tightening bolt 53B the stack of mating rings and spacer sleeves is held in place. By tightening bolt 36, sleeve 33 is forced axially inward along sleeve 34 into locking engagement with flange 52. Thus, specific locks and keys, when sleeve 34 rotates, provide the drive for the mating rings 30A, 30B and 30C together with the related flange supports 50, to rotate therewith.

The retainer assembly for the primary rings of the seals comprises inboard, intermediate and outboard retainers 54, 55 and 56 connected one to another by cap screws 57 or otherwise in any suitable fashion. The inboard retainer 54 serves to support the inboard primary ring 26A. The intermediate retainer 55 supports the intermediate primary ring 26B and the outboard retainer 56 similarly supports the outboard primary ring 26C. Each retainer carries multiple springs 58 and a spring disk 60 which together urge the primary seal ring faces into engagement with the grooved faces of the mating rings. The disks 60 and springs 58 permit primary rings 26A, 26B and 26C to move axially in either direction. O-ring seals 61 provide a secondary seal between the primary rings and retainers 54, 55 and 56.

A gland plate 62 is connected to housing 12 by screws (not shown). The gland plate has a flange 64 engaging the outer end face of the retainer 56. The retainer is connected to the flange by cap screws 66.

The transfer of gas at reduced pressure will be described in detail below but it may here be mentioned that a vent opening 68 communicates chamber 23 with a passage 70 in the housing exposed to atmospheric pressure, allowing gas released from chamber 23 to be transferred to a flare stack or other environment for capturing, using or disposing of the vented gas. Further, downstream seal module 24 acts to seal the small amount of gas which may leak from chamber 23; but because of the low pressure of the gas in chamber 23, leakage through seal module 24 will usually be negligible. Thus, the amount of gas transferring across the dam of this seal module is little (not collectible) and the final pressure at the I.D. may be close to nil. In this sense the third seal may serve as a safety in the event of an obstructed vent for example. The advantage of venting cavity 23 via vent passage 68-70 is to bring the noncollectible leakage around the shaft downstream of said module 24 to a minimum.

It will be noted that the I.D. and sloped radial surfaces of the retainers 54 and 55 are spaced from the opposed surfaces of the flange supports 50, thereby providing transfer passages 21P and 23P for gas leak flow (pumped) across the dam of seal module 20 into chamber 21 and for gas leak flow (pumped) across the dam of seal module 22 into chamber 23. A passage 72 to chamber 21 may be provided with a gage attached to be able to read the pressure in chamber 21.

Mating rings 30A, 30B, 30C each have a series of spiral grooves 92 (shown in phantom in FIG. 1) which will now be discussed in detail with reference to FIG. 2. Thus, FIG. 2 shows a portion of a mating surface on a mating ring opposed to a primary ring. For purposes of description, the face 32A of mating ring 30A is shown in FIG. 2. The face has a plurality of circumferentially spaced, spiral grooves 92 extending radially from an open end at the outer circumference partially across the radial width of the face 32A. The ungrooved surface 94 defines a sealing dam or land which in cooperation with the opposed face of the primary seal ring provides a hydrostatic static seal when the shaft 16 is not rotating. Faces 32B and 32C of the seal modules 22 and 24 are similarly configured to present pumping grooves as 92 and lands 94.

When shaft 16 is not rotating, pressurized gas is sealed by a hydrostatic film between the rings at the sealing dam. When the shaft starts rotating, the grooves 92 pump gas radially inwardly across the seal faces causing the seal faces to open slightly.

As the gas is transferred across the dam of seal module 20 to passage 21P it enters chamber 21, and the operational parameters of the seal provide for a pressure drop from full pressure, e.g. about 1800 p.s.i.g. in chamber 18, to approximately one-half of that pressure, or about 900 p.s.i.g. in chamber 21, opening seal module 22. This is a virtually instantaneous pressure drop because the instant the upstream seal of module 20 opens against the closing bias of the related springs 58, gas is transferred at the same moment to chamber 21 through passage 21P; seal module 22 is likewise instantly opened and the gas pressure is instantly divided, relieving the high pressure in the high pressure upstream chamber 18.

It should be kept in mind that while the pumped actual volume (leakage) of fluid across the dam of the second seal is larger than the first, at the actual pressure of the module, the mass flow rate across each seal interface is constant at all times.

Intermediate seal 22 itself provides for a further pressure drop across the relatively rotating seal faces from about one-half of full pressure to a pressure slightly above atmospheric pressure. Preferably chamber 23 has a pressure of about 9 to 15 p.s.i.g. over atmospheric pressure, which is the result of the restriction presented by vent passage 68-70 exposed to atmospheric pressure. In fact, the third seal, and if used, may be present as a mere leakage collector of small capacity. As described above, this gas is vented through vent 68 for disposal in one form or another.

No seal can be expected to perform constantly in accordance with design limits without some change due to the rigors of performance, coupled with the possibility of mechanical and thermal imbalance not possible to predict or anticipate. Consequently, the third seal may perform redundantly, and if there is a change in pressure profile during service, the result will be a self-adjusting accommodation of pressure drop across the three seal faces as a back-up to either of the upstream seals. Regardless of whether there are two or three seals in tandem, no one seal is subjected to the full pressure load and operates at a level well below its design capability.

The above described system provides a number of unique attributes and advantages to presently known sealing systems. First and foremost, presently known mechanical end seals of the spiral groove type having the same geometry (I.D., O.D. and thickness) can be utilized by altering parameters of the groove design, such as groove depth and dam width, together sealing against much greater pressures than has heretofore been possible with a greatly increased seal integrity at higher pressures. This results in a much reduced level of gas loss due to leakage. Specifically, the pressure split across each of the spiral groove type sealing modules can be achieved by components that can be converted from presently known configurations simply by etching the grooves to different depths in the preferred form of practice.

In comparison, trying to accomplish a split of pressure of the high magnitude here involved (e.g. 1800 p.s.i.g.) with other kinds of mechanical end seals would require external controls, considerable structural changes and additions of compensating elements because of the great pressure differentials involved. Greater bulk would be required in comparison to an end seal of the spiral groove type so employed under the present invention as to exploit the leak phenomenon at the I.D. The greater the bulk, the greater the chance for imbalance, there are more areas subject to wear, and so on.

Further attributes of this system are the ability to seal gases of much higher pressures than have heretofore been possible without the use of complex and elaborate external pressure control systems and for massive seal geometry.

These attributes can be readily perceived by assuming a pressure of 1800 p.s.i.g. in chamber 18 and a shaft speed of 10000 rpm. If the spiral groove depth in the first seal module is 200 microinches and if this depth parameter is increased to 400 microinches in the second seal, the pressure drop across the first seal is reduced by approximately fifty percent to 900 p.s.i.g., relieving the first seal of considerable stress. For most applications, this fifty percent reduction is adequate. Nonetheless, in like manner, when a third seal is present, the spiral grooves in the mating ring of that seal result in a further pressure drop across the relatively rotating faces of the second seal, and this reduction may result in virtually nil pressure in chamber 23 if vented (68-70) as described above.

A change in dam width can replace or supplement the groove depth parameter difference. There may be circumstances where two upstream seals (e.g. seal modules 20 and 22) are each to be at substantially full pressure and the third seal module becomes the one responsible for the pressure split. Various terms and analogies may be used to explain the phenomenon involved at the seal faces when splitting the pressure. The principle employed is that no seal is perfect, and we exploit that circumstance by employing a pair (at least) of tandem end face seals of the spiral groove type so that leakage may be exploited merely by varying groove dimensions without need to alter any other geometry of an inventory of such seals.

The total gas leakage across each seal, taken as a mass (lbm/min) is the same at each seal. Because the spiral grooves of the downstream seal present a larger volume than those of the upstream seal, the gas has more room for expansion within the larger groove volume and hence is of less density (occupying a larger actual volume) than the gas transferred thereto by the upstream seal grooves. Therefore, while it may be convenient to refer to different volumes (or pumping capacity) being pumped across the respective seal interfaces per unit of time (and at any instant of time), it is to be borne in mind the mass flow rate across each seal is the same at all times.

Another and perhaps more apt description is that the seals may be considered flow restrictors (valves) in which the downstream seal, with deeper spiral grooves (in the preferred form) offers less restriction to gas flow than the one upstream, at the higher pressure. The pressure must therefore drop, as when opening the nozzle valve of a garden hose: the rate of water flow is the same as before, when the nozzle was less restrictive, but because the nozzle passage has been widened the stream of fluid now flows out at reduced pressure, covering more area but with less force compared to the more forceful stream reaching a greater distance (more pressure) which prevailed when the nozzle restriction was greater.

Whereas a preferred form of the invention has been shown and described, it will be realized that alterations may be made thereto without departing from the scope of the following claims.

We claim:

1. A multiple tandem spiral groove end seal system for a rotatable shaft extending through a housing containing gas under high pressure, the system comprising axially spaced apart first and second seal modules located in respective upstream and downstream seal chambers within the housing, said chambers being isolated from each other and only communicating with one another through said respective seal modules and through a passage, each of said modules having opposed radially extending seal faces presented by a primary ring secured to the housing and a mating ring rotating with the shaft, the rings having substantially the same diameter and thickness geometry, the mating ring seal faces each having a plurality of radially inwardly pumping spiral grooves extending part-way across the face thereof inwardly from the outer circumference toward the inner diameter thereof, means biasing the seal faces of the respective modules toward one another and said seal faces opening when the shaft is rotating to permit gas communication from the upstream chamber only by the spiral grooves of the first seal module and through said passage into the downstream chamber, and the spiral groove dimensions of the respective seal modules differing so as to produce a predetermined drop in pressure of said gas between the upstream and downstream seal chambers.

2. A seal system as claimed in claim 1 wherein said housing includes a third seal module downstream of the second, said third seal module being identical in geometry to the other two and operating in a chamber vented to atmosphere.

3. A seal system as claimed in claim 1 wherein the spiral grooves of said second module have a volumetric capacity which reduces by about one half the pressure across the seal faces of the first seal module.

4. A seal system as claimed in claim 2 wherein the spiral grooves of said second module have a volumetric capacity which reduces by about one half the pressure across the seal faces of the first seal module.

5. A gas compressor end face seal which also splits or divides the pressure of a gas between spaced chambers comprising two axially spaced seal assemblies interposed between a housing and a rotary shaft extending therethrough, one seal assembly located within a first or upstream chamber in the housing where a gas at high pressure prevails, and a second seal assembly located within a downstream chamber inside the housing where the gas is reduced to a predetermined lower pressure greater than ambient pressure, a first passage for transferring gas from the upstream chamber to the downstream chamber, a second passage for releasing gas at reduced pressure from the downstream chamber, each seal assembly being of the opposed two-ring spiral groove type concentric to the shaft, and, for each seal assembly, one seal ring being a primary seal ring and the other seal ring a mating ring having in its seal face, opposed to the primary seal ring, a plurality of circumferentially spaced spiral grooves which open at the outer ring diameter and extend but part way across the mating ring face to provide an ungrooved dam portion in the mating ring face surrounding the inside diameter of the mating ring, said first seal communicating only across the seal faces with said first passage, and said ungrooved dam for the second seal communicating with the second seal passage, whereby during rotation of the shaft the spiral grooves transfer gas only from the related chambers radially across the seal faces and into the related passages, passage means to release gas at reduced pressure from the downstream chamber, and the depth of the spiral grooves and the width of the dam in the mating seal ring of the second or downstream seal being such as to reduce the high pressure in the first chamber to a predetermined lower pressure greater than ambient pressure in the second chamber.

6. An end face seal according to claim 5 in which the seal rings of the two seal assemblies have substantially identical diametric and width geometry with the spiral grooves of the mating ring in the second seal assembly considerably deeper than those of the mating ring in the first seal assembly.

7. An end face seal according to claim 5 in which a third seal assembly, concentric to the shaft, is spaced downstream of the second seal assembly and located within a third seal chamber inside the housing, said third seal assembly being of the same geometry as the first and second seal assemblies, and said third seal chamber being vented to atmosphere.

8. In a gas compressor having a housing through which passes a shaft which is rotated during dynamic operation of the compressor, a first or high pressure gas chamber within the housing and a second gas chamber within the housing, a gas transfer passage for passing gas from the first to the second chamber, first and second mechanical spiral groove type end face seal assemblies in spaced tandem relation along said shaft and respectively assigned to said chambers, each seal assembly including opposed primary and mating rings having seal faces biased to provide sealing contact adjacent their inner diameters, the mating rings in each assembly being rotatable with said shaft during dynamic operation of the compressor and having spiral grooves in the face thereof communicating at the outer ring diameter with the respective chamber and shaped to transfer gas only from the related chamber radially inward toward the inside diameter of the shaft during rotation of the shaft to break said sealing contact, a passage for receiving gas so transferred and only said passage in turn transferring the pumped gas to the second chamber, the spiral grooves of the second seal assembly presenting considerably greater volume than those of the first, thereby to produce a considerable drop in pressure of gas in the second chamber compared to the first, and passage means to release gas at reduced pressure from the second chamber.

9. A gas compressor according to claim 8 in which the spiral of the second seal assembly account for a pressure drop of about 50%.

10. A gas compressor according to claim 9 in which the primary and mating rings of each seal assembly present substantially the same diametric and thickness geometry with the spiral grooves of the second seal assembly being considerably deeper than those of the first, the difference in groove depth accounting for the pressure drop.

11. A gas compressor according to claim 10 in which a third seal assembly, concentric to the shaft, is spaced downstream of the second seal assembly and located within a third seal chamber inside the housing, said third seal assembly being of the same type and geometry as the first and second seal assemblies, and said third seal chamber being vented to the atmosphere.

12. A method of employing a plurality of mechanical end face seal assemblies of the spiral groove type to produce a pressure drop of a gas under high pressure between axially spaced chambers within a housing having a rotatable shaft extending therethrough, one chamber containing the gas at the highest pressure during rotation of the shaft and the other chamber to receive the gas at reduced pressure transferred thereto from the first high pressure chamber only across the mechanical face seal assemblies, said method comprising the steps of:

A. selecting for each seal assembly a primary ring and mating ring having outer and inner diameters, said rings having substantially identical diametric and thickness profiles, the two rings having opposed sealing faces, the sealing face of the mating ring having spiral grooves extending across the seal face thereof from the outer circumference to an ungrooved annular dam surrounding the inner diameter, said grooves transferring the gas across said dam and across the inner diameter of the seal assembly and, in dynamic operation, separating the primary ring from the mating ring and breaking said sealing contact;

B. determining an operating pressure split to take place between said chambers, and the mass flow rate across one of the seals, as a function of (1) the pressure in either one of the chambers and (2) the volume of transfer across the face of the dam into that chamber during dynamic operation;

C. changing the dimensions of the spiral grooves of the downstream seal to result in the same mass flow rate across each seal assembly during said split in operating pressure, said mass flow rate remaining substantially constant at all times during dynamic operation, the difference in dimensions of the spiral grooves providing for said pressure split in the gas between said seal chambers;

D. operatively assemblying the seal assemblies in axially spaced relation with respect to said shaft and within the respective high reduced pressure chambers in said housing so that the seal assemblies will each result in a seal between the shaft and the related housing; and E. providing, during said assembling step, a passage from the inner diameter of the first seal assembly to the second chamber, said passage and first seal assembly providing the only means of gas transfer from said first chamber to said second chamber.

13. Method according to claim 12 in which step C involves deepening the spiral grooves of the downstream seal.

14. A multiple tandem spiral groove end seal system for a rotatable shaft extending through a housing containing gas under high pressure, the system comprising axially spaced apart first and second seal modules located in respective upstream and downstream seal chambers within the housing and communicating with one another through a passage, each of said modules having opposed radially extending seal faces presented by a primary ring secured to the housing and a mating ring rotating with the shaft, the rings having substantially the same diameter and thickness geometry, the mating ring seal faces each having a plurality of radially inwardly pumping spiral grooves extending part-way across the face thereof inwardly from the outer circumference toward the inner diameter thereof, means biasing the seal faces of the respective modules toward one another and said seal faces opening when the shaft is rotating whereby gas from the upstream chamber is only passed by the spiral grooves of the first seal module through said passage into the downstream chamber to provide communication between the seal modules, and the spiral groove dimensions of the respective seal modules differing so as to produce a predetermined drop in pressure of said gas between the upstream and downstream seal chambers.

15. A seal system as claimed in claim 14 wherein said housing includes a third seal module downstream of the second, said third seal module being identical in geometry to the other two and operating in a chamber vented to atmosphere.

16. A seal system as claimed in claim 14 wherein the spiral grooves of said downstream module have a volumetric capacity which reduces by about one-half the pressure across the seal faces of the first seal module.

17. A seal system as claimed in claim 15 wherein the spiral grooves of said second module have a volumetric capacity which reduces by about one-half the pressure across the seal faces of the first seal module.

18. A gas compressor end face seal which also splits or divides the pressure of a gas between spaced chambers comprising two axially spaced seal assemblies interposed between a housing and a rotary shaft extending therethrough, one seal assembly located within a first or upstream chamber in the housing where a gas at high pressure prevails, and a second seal assembly located within a downstream chamber inside the housing where the gas is reduced to a predetermined lower pressure, a first passage for transferring gas from the upstream chamber to the downstream chamber, a second passage for releasing gas at reduced pressure from the downstream chamber, each seal assembly being of the opposed two-ring spiral groove type concentric to the shaft, one seal ring being a primary seal ring and the other seal ring a mating ring having in its seal face, opposed to the primary seal ring, a plurality of circumferentially spaced spiral grooves which open at the outer ring diameter and extend but part way across the mating ring face to provide an ungrooved dam portion in the mating ring face surrounding the inside diameter of the mating ring, said first seal communicating with said first passage only through a gap which arises between the seal faces of the mating ring and the primary ring during dynamic operation of the compressor, and said ungrooved dam for the second seal communicating with the second seal passage only through a gap which arises between the second seal assembly primary ring and mating ring during dynamic operation of the compressor, whereby during rotation of the shaft the spiral grooves transfer fluid from the related chambers radially across the seal faces and into the related chambers radially only across the seal faces and into the related passages, passage means to release gas at reduced pressure from the downstream chamber, and the depth of the spiral grooves and the width of the dam in the primary seal ring of the second or downstream seal being such as to reduce the high pressure in the first chamber to a predetermined lower pressure in the second chamber.

19. An end face seal according to claim 18 in which the seal rings of the two seal assemblies have substantially identical diametric and width geometry with the spiral grooves of the mating ring in the second seal assembly considerably deeper than those of the rotor in the first seal assembly.

20. An end face seal according to claim 18 in which a third seal assembly, concentric to the shaft, is spaced downstream of the second seal assembly and located within a third seal chamber inside the housing, said third seal assembly being of the same geometry as the first and second seal assemblies, and said third seal chamber being vented to atmosphere.

21. A method of employing a plurality of mechanical end face seal assemblies of the spiral groove type to produce a pressure drop of gas under pressure between axially spaced chambers within a housing having a rotatable shaft extending therethrough, one chamber containing gas at the highest pressure during rotation of the shaft and the other chamber to receive gas at reduced pressure transferred thereto from the first high pressure chamber, said method comprising the steps of:

A. selecting for each seal assembly a primary ring and a mating ring having outer and inner diameters, said rings having substantially identical diametric and thickness profiles, the two rings having opposed sealing faces, the sealing face of the mating ring having spiral grooves extending across the seal face thereof from the outer circumference to an ungrooved annular dam surrounding the inner diameter, only said grooves transferring gas across said dam and across the inner diameter of the seal assembly in dynamic operation, separating the primary ring from the mating ring and breaking said sealing contact;

B. determining an operating pressure split to take place between said chambers, and the mass flow rate across one of the seals, as a function of (1) the pressure in either one of the chambers and (2) the volume of transfer across the face of the dam into that chamber during dynamic operation;

C. changing the dimensions of the spiral grooves of the downstream seal to result in the same mass flow rate across each assembly during said split in operating pressure, said mass flow rate remaining substantially constant at all times during dynamic operation, the difference in dimensions of the spiral grooves providing for said operating pressure split in said gas between said seal chambers;

D. operatively assembly the seal assemblies in axially spaced relation with respect to said shaft and within the respective high and reduced pressure chambers in said housing so that the seal assemblies will each result in a seal between the shaft and the related housing; and E. providing during said assemblying steps, a passage from the inner diameter of the first seal assembly to the second chamber, said passage and first seal providing the only means of gas transfer from said first chamber to said second chamber.

22. Method according to claim 21 in which step C involves deepening the spiral grooves of the downstream seal.

* * * * *